C. S. LOCKWOOD.
ROLLER BEARING WITH LOOPED CAGE.
APPLICATION FILED JUNE 18, 1910.

995,471.

Patented June 20, 1911.

Witnesses
L. Lee
J. Walter Greenbaum

Inventor
Charles S. Lockwood, per
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING WITH LOOPED CAGE.

995,471.
Specification of Letters Patent. Patented June 20, 1911.
Application filed June 18, 1910. Serial No. 567,548.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Roller-Bearings with Looped Cages, fully described and represented in the following specification and the accompanying drawings, forming a part of the same.

This invention is designed to cheapen the manufacture of a cage for guiding a series of inclined rolls within a roller bearing.

This improved cage consists of a series of inclined loops integrally connected at their open ends, each loop being adapted to receive and guide a roll within the roller bearing. The loops may be formed to retain the rolls upon the hub before the casing is applied thereto, thus facilitating the handling of those parts until the bearing is entirely completed.

The invention will be understood by reference to the annexed drawing, in which—

Figure 1:
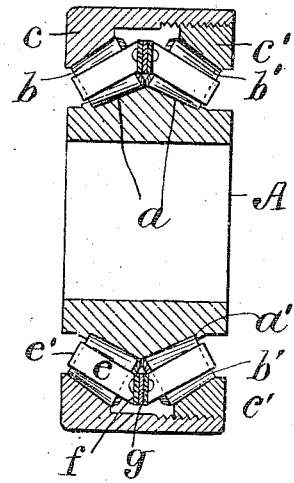
Figure 2:
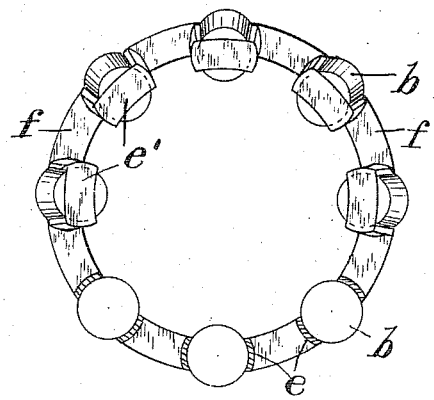
Figure 4:
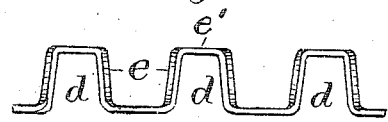
Figure 3:
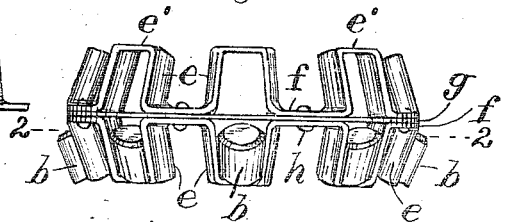
Figure 5:
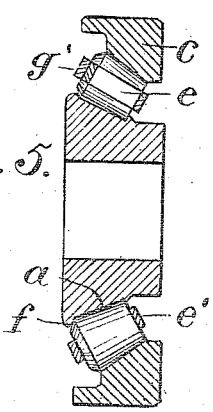

Figure 1 is a longitudinal section, where hatched, of a bearing having a double conical hub and two sets of tapering rolls fitted thereto and provided with the improved cage; Fig. 2 is an end view of the hub, the rolls, and the cage with the lower half of the cage in section on line 2—2 in Fig. 3; Fig. 3 is a plan of the cage for the bearing of Fig. 1 with the rolls shown in one-half of the cage; Fig. 4 is a diagram showing the relation of the loops to one another as if formed of a continuous strip; Fig. 5 is a longitudinal section of a bearing having one set of bearing-rolls; and Fig. 6 shows two series of loops united without an intermediate plate.

A designates the hub of the bearing shown with inclined bearing-seats $a$ united at their bases, and two sets of inclined rolls $b$, $b'$, fitted to such bearing-seats. Bearing-seats $c$ and $c'$ are shown in the casing adapted to embrace the outer sides of the rolls. The hub in Fig. 1 has a small shoulder $a'$ at the smaller end of the rolls.

Figure 6:
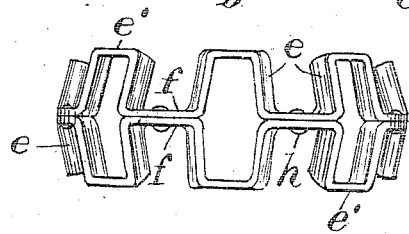

The chief element of the cage is a series of inclined loops $d$ formed from a circular ring of sheet-metal bent by successive stampings into the shape shown in Fig. 3, each loop having side-bars $e$ extended the whole length of the roll, a front piece $e'$, and the sides $e$ connected at their inner ends by a foot $f$. The side-bars, like the axes of the rolls, all slope toward a common center. In Figs. 1 and 3 these feet $f$, which are integral with the loops, are connected to a common tie-plate $g$ of circular form; being secured thereto by rivets $h$ extended through the feet and the plate. The plate is a flat ring adapted to rotate about the hub A at the middle of its length, and the loops project obliquely from the plate to embrace the opposite sides of the rolls $b$, $b'$. To retain the rolls upon the hub before the casing is applied, the side-bars $e$ of each loop are curved to fit the sides of the roll, as shown where the side-bars are sectioned in the lower part of Fig. 2. The side-bars of the loops are made long enough to embrace the entire sides of the rolls, and are sloped at the same angle as the rolls so as to converge to a common center with the rolls. The loops are so proportioned that the rolls turn freely between the curved side-bars in contact with the front piece $e'$, but when assembled upon the hub are retained thereon in contact with the shoulder $a'$, which is provided to prevent end movement of the rolls while assembling them, and when in operation.

Where the side-bars $e$ are concaved so as to fit the rolls, as shown in Fig. 2, the rolls must be inserted from the open end of the loop $d$, and the looped portion of the cage can then be attached to a flat ring as $g$, or to a similar looped portion projected in the opposite direction, as shown in Fig. 6. The rolls and cage then form a connected or self-contained structure which can be handled independently of the hub and casing. When applying the rolls to the hub with the looped portion of the cage, the rolls which are tapering, can be pushed toward the wider end of the loop to pass them simultaneously over the shoulder $a'$.

Where only a single set of rolls is used, the ring $g$ connected with the looped portion of the cage can be dished, as shown at $g'$ in Fig. 5, and fitted quite near to the inner ends of the rolls. The loops in such case have the feet $f$ transverse to the sides of the loops; but with the loops shown in Figs. 1 and 3, the feet $f$ are set oblique to the sides of the loops in order to join the ring $g$ in the center of the casing.

The construction of Fig. 1 with two sets of rolls shows the adjacent ends of the rolls tapered to roll in contact with one another, thus holding the rolls from riding upward on the hub, which is their natural tendency under lateral pressure of the casing, but with the construction of Fig. 5, with a single set of rolls, a collar $a^2$ is provided upon the larger end of the hub against which the larger ends of the rolls rotate.

In Fig. 6, two series of loops adapted to guide two adjacent sets of rolls are shown with the feet united directly to one another without any intermediate ring $g$, and such construction is operative because rolls adjacent to one another are free only to move outwardly; which is resisted by the front piece $e'$ on each loop.

My cage differs from those used in guiding balls, in which two complete similar looped sections are employed to embrace opposite sides of the balls, whereas, the straight sides of rolls permit the cage in my construction to be formed with only a single set of loops with the side-bars of the same length as the rolls. Where two adjacent sets of rolls are employed, as in Fig. 1, the cage may be constructed as in Fig. 6, without any ring attached to the feet $f$, but where only a single set of rolls is used, as in Fig. 5, the ring $g'$ is necessary to hold the loops upon the rolls.

Having thus set forth the nature of the invention what is claimed herein is:

1. In a roller bearing, the combination, with inclined bearing-seats and a series of inclined tapering rolls converging toward a common center, of a sheet-metal cage comprising a series of integrally connected loops with sides inclined toward a common center and extended the entire length of the rolls.

2. In a roller bearing, the combination, with a hub and casing having inclined bearing-seats and a series of inclined tapering rolls converging toward a common center, of a sheet-metal cage comprising a series of integrally connected loops with sides inclined toward a common center and extended the entire length of the rolls and such sides curved to fit the sides of the rolls and operating to hold them in the cage as a self-contained structure.

3. A self-contained set of rolls and cage for a roller bearing, comprising a series of tapering rolls, a series of integrally connected loops having side-bars extended the entire length of the rolls, and such sides curved to fit the sides of the rolls, and a tie-plate or ring secured to the feet of the loops, and covering the open ends of the loops to retain the rolls therein.

4. A roller-bearing having a double conical hub, sets of tapering rolls fitted to the bearing-seats upon the opposite ends of the hub, a tie-plate intermediate the adjacent ends of the rolls, and a series of loops projected from each side of such plate and embracing the opposite curved sides of the rolls and adapted to retain them upon the hub and guide them within the casing.

In testimony whereof I have hereunto set my hand in the presence of two subscribing witnesses.

CHARLES S. LOCKWOOD.

Witnesses:
IVY W. ASLIN,
WILLIAM D. BROWN.